Patented Aug. 2, 1949

2,477,641

UNITED STATES PATENT OFFICE 2,477,641

POLYHYDROXY BENZENE-FORMALDEHYDE RESINOUS COMPOSITIONS AND METHOD OF PREPARING THE SAME

Fritz J. Nagel, Pittsburgh, Pa., assignor to Westinghouse Electric Corporation, East Pittsburgh, Pa., a corporation of Pennsylvania No Drawing. Application January 5, 1946, Serial No. 639,431

12 Claims. (Cl. 260—54)

1

This invention relates to resinous reaction products and, in particular, to the reaction products of polyhydroxy benzenes and formaldehyde.

This application is a continuation-in-part of my copending patent application Serial No. 519,189, filed January 21, 1944, now abandoned.

While it has been proposed heretofore to react polyhydroxy benzenes, such, for example, as resorcinol, with formaldehyde to form a resin, the reaction is quite violent and is not suitable for commercial practice. With equimolar proportions of the reactants, the reaction is almost impossible of control. Furthermore, the reaction products produced have been characterized by instability and lack of good keeping qualities. Numerous attempts have been made to modify the rate of reaction of resorcinol and formaldehyde, for example, by adding modifying agents, or by applying involved cooling means in order to produce a resinous product suitable for commercial use, but without any significant commercial success.

It has been held desirable to produce a resinous material from substantially equimolar proportions of 1,3 polyhydroxy benzenes and formaldehyde because the extreme reactivity is desirable in one sense, in that curing of the resin to an infusible and insoluble stage may be carried out at temperatures of below 100° C. in a short period of time. This would render it possible to mold resinous members of a thermosetting nature under conditions that ordinarily are not feasible with monohydroxy benzene and formaldehyde resins. Numerous other advantages are inherent in polyhydroxy benzene and formaldehyde resinous products providing it were possible to control the reaction and to produce a material that would not deteriorate in ordinary storage and handling.

The object of this invention is to provide for controllably reacting polyhydroxy benzene and formaldehyde.

A further object of this invention is to provide for reacting formaldehyde with a polyhydroxy benzene having hydroxyl groups in the 1,3 positions at a given rate and under controlled conditions to provide for predetermined properties.

A further object of this invention is to provide for a partial reaction product of a polyhydroxy benzene having hydroxyl groups in the 1,3 positions and formaldehyde suitable for storage for a prolonged period of time without undesirable changes.

A still further object of this invention is to

2 provide for molded resinous compositions containing the reaction product of substantially equimolar proportions of a polyhydroxy benzene having hydroxyl groups in the 1,3 positions and formaldehyde.

Other objects of the invention will in part be obvious and will in part appear hereinafter.

According to the present invention, I have been able to react controllably to produce resinous products substantially equimolar proportions of formaldehyde, or a polymer of formaldehyde, with a polyhydroxy benzene having the unit formula

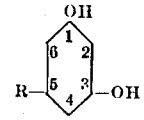

R is a radical selected from the group consisting of hydrogen, hydroxyl, halide, carboxyl, and aliphatic radicals and having not more than one substituent selected from this group for hydrogen in the 2,4,6 positions. Examples of suitable polyhydroxy benzenes having the above unit formula are resorcinol, orcinol (5-methyl-1,3-dihydroxy benzene), pyrogallol (1,2,3-trihydroxy benzene), 1,3-dihydroxy-4-chlorobenzene, alpha-resorcylic acid (3,5-dihydroxy benzoic acid) and phloroglucinol (1,3,5-trihydroxy benzene).

For controllably reacting with the polyhydroxy benzene having the above unit formula, it is necessary to employ substantially anhydrous formaldehyde or an anhydrous polymer of formaldehyde and effect the reaction in the absence of any substantial amount of water. Exceptionally good results have been obtained with paraformaldehyde. Trioxane, using a mineral acid catalyst to effect depolymerization thereof, will give good results. Other polyoxymethylenes substantially free from any water may be employed in the practice of the invention. The polyhydroxy benzene must be substantially anhydrous.

The reaction of a polyhydroxy benzene having the unit formula

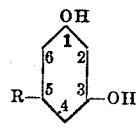

as above described, with substantially anhydrous formaldehyde or its polymers may be controllably conducted only in the presence of substantially anhydrous solvent composed of a certain minimum of methanol as the critical ingredient. By substantially anhydrous methanol is meant methanol with less than 2% water—preferably 99% to 100% pure methanol. The anhydrous methanol must be present in an amount equal to at least 25% of the combined weight of the polyhydroxy benzene, formaldehyde and solvent. Best results have been obtained where the methanol comprises the entire solvent and is approximately 35% to 40% of the total of the reactants and solvent. Larger amounts of methanol may be employed with added benefits. The term "methanol" as employed herein refers to substantially anhydrous methanol.

It has been found that no other solvent than anhydrous methanol enables making a predetermined reaction product from equimolar proportions of 1,3-polyhydroxy benzenes and formaldehyde, in either laboratory or commercial batches. Anhydrous ethanol, while tempering the reaction in quantities of less than a liter, is ineffective in preventing violent reaction in larger batches.

A catalyst for promoting the reaction of the polyhydroxy benzene and formaldehyde is required. The amount of any one catalyst may vary within a relatively wide, though critical, range. Both acidic, basic, and salt catalysts may be employed. The proportion of catalyst depends upon the relative strength of the catalyst. For example, in reacting equimolar proportions of resorcinol and paraformaldehyde in the presence of 45% methanol based on the weight of the resorcinol, the following proportions of various catalysts based on the weight of resorcinol gave good results:

*Example I*

|  | Per cent |
|---|---|
| Ammonium hydroxide | 0.4 |
| Aniline | 0.60 |
| Ethylene diamine | 0.2 |
| Hydrochloric acid | 0.04 |
| Phosphoric acid | 0.1 |
| Oxalic acid | 0.2 |

Using one-quarter of the proportions indicated in Example I, the reaction was smooth, though slightly slower. Other suitable acidic catalysts are sulphuric acid and acetic acid. Other basic catalysts that may be employed are sodium hydroxide, calcium hydroxide, m-phenylene diamine, p-phenylene diamine, and hexamethylenetetramine. Ferric chloride and other salts which give a strong reaction also may be employed. Substantially the same proportions of catalyst may be employed in reacting other polyhydroxy benzenes than resorcinol.

The amount of catalyst may be increased somewhat over the above proportions given in Example I, particularly if larger proportions of anhydrous methanol are present; thus with 114% methanol, based on the weight of the resorcinol, 1% of ammonium hydroxide gives good results. With 114% methanol, 0.25% of hydrochloric acid may be successfully employed.

As little as 0.01% ammonium hydroxide or hydrochloric acid has been employed with satisfactory reaction. In some cases these lesser amounts of catalyst are beneficial in that the reaction is smoother and easier to control. While the anhydrous solvent employed as the reaction medium must contain methanol as the critical ingredient, it is possible to add other low boiling point non-reactive solvents that are stable in the presence of formaldehyde and the polyhydroxy benzene, providing the boiling point of such added solvent does not exceed 100° C. and that the reflux temperature does not appreciably exceed 100° C. Anhydrous ethanol, isopropanol, n-butanol, ethyl acetate, n-butyl acetate and ethyl propionate may be combined with the methanol for this purpose. In any event, the proportion of methanol to the entire reaction mixture including the solvent should be at least 25%, preferably higher. The other components of the solvent, other than methanol, act as diluents and do not appreciably contribute to the control of the reactivity of the polyhydroxy benzene and formaldehyde.

The following examples, in which all parts are by weight, illustrate the preparation of the 1,3-polyhydroxy benzene-formaldehyde resins of this invention, as low polymers in the A-stage.

*Example II*

|  | Parts |
|---|---|
| Resorcinol | 440 |
| Paraformaldehyde | 120 |
| Methanol anhydrous | 250 |
| Ammonium hydroxide | ¼ |

The methanol was placed in a closed reaction vessel equipped with a mechanical stirrer and reflux condenser. Then the resorcinol and paraformaldehyde were added. The reaction vessel was heated externally while the reaction mixture was being rapidly stirred. The reaction temperature was brought to the reflux point of methanol (about 75° C.) and gradually decreased thereafter to about 68° C. In some cases, the temperature may reach a maximum of about 85° C. During the heating process, the milky color due to the paraformaldehyde being suspended in the methanol disappeared in about twenty minutes. After refluxing for sixty minutes, the reaction had resulted in a suitable resinous product in the "A"-stage. Thereafter, 122 parts of methanol were added to terminate the reaction. The viscosity of the resinous solution, or varnish, at 25° C., with a No. 1 Demmler cup, was 48 seconds. It is desirable to add a small amount of an acid to neutralize the ammonium hydroxide, thereby to improve the stability of the resin solution in storage.

*Example III*

|  | Parts |
|---|---|
| Resorcinol | 440 |
| Paraformaldehyde | 120 |
| Methanol—99–100% | 250 |
| Concentrated ammonium hydroxide | ¼ |

These ingredients were reacted as under Example II, but at the end of sixty minutes reflux time, 244 parts by weight of n-butanol were added.

*Example IV*

|  | Parts |
|---|---|
| Resorcinol | 220 |
| Paraformaldehyde | 70 |
| Methanol—99.7% | 250 |
| Hydrochloric acid | ½ |

These ingredients were reacted in a closed reaction vessel equipped with a reflux column by heating to 75° C. when refluxing began and the temperature fell to 68° C. in 30 minutes. The resin solution was viscous but clear at the end of this time. To the solution was added 120 parts of methanol to cool the solution and to provide a solution of low viscosity for various applications. Sufficient sodium hydroxide was added to neutralize the hydrochloric acid catalyst thereby rendering the resin solution more stable in storage. This solution was held in storage for many months without gelling.

Example V

|  | Parts |
| --- | --- |
| Orcinol | 200 |
| Paraformaldehyde | 48 |
| Methanol | 111 |
| Concentrated ammonium hydroxide | 1/8 |

The reactants were refluxed in a closed reaction vessel at a temperature of from 75° C. to 82° C. After twenty minutes refluxing, after reaching 75° C., the resin solution was found to be suitable for use as an A-stage resin varnish and the reaction was terminated by adding 55 parts of methanol and cooling to room temperature.

Example VI

|  | Parts |
| --- | --- |
| Pyrogallol | 252 |
| Paraformaldehyde | 60 |
| Anhydrous methanol | 108 |
| Concentrated ammonium hydroxide | 1/8 |

The ingredients were reacted in a closed reaction vessel under reflux in a temperature range of from 70° C. to 86° C. The reaction was terminated after thirty minutes refluxing to a final temperature of 70° C. Fifty-three parts of methanol were added to terminate the reaction. The resulting resin solution was found to be satisfactory for various applications.

Example VII

|  | Parts |
| --- | --- |
| 1,3-dihydroxy-4-chlorobenzene | 200 |
| Paraformaldehyde | 42 |
| Methanol | 108 |
| Concentrated ammonium hydroxide | 1/8 |

The reactants were refluxed in a temperature range of 75° C. to 86° C. Refluxing was continued for thirty-five minutes at which time a temperature of 75° C. was reached. Thereafter, 53 parts of methanol were added to terminate the reaction. Tests of the resulting resin solution indicated it had properties highly suitable for various applications.

Example VIII

|  | Parts |
| --- | --- |
| Phloroglucinol | 162 |
| Paraformaldehyde | 30 |
| Methanol | 129 |
| Concentrated ammonium hydroxide | 1/8 |

The reactants were refluxed in a temperature range from 60° C. to 85° C., the refluxing being continued for twenty minutes during which a temperature of 60° C. was reached. Thereafter, 63 parts of methanol were added to terminate the reaction. The resulting resin varnish was found to be satisfactory for application to various members.

By employing anhydrous reactants and the necessary proportions of methanol, it is easy to produce predetermined resinous products in which the proportions of the polyhydroxy benzene having the unit formula

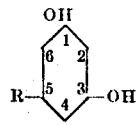

as described previously, with formaldehyde may vary from 0.67 to 1.1 moles of the polyhydroxy benzene for each mole of the formaldehyde. Resinous products suitable for most applications are prepared from substantially equimolar proportions of the polyhydroxy benzene and formaldehyde since best results for many applications are obtained with one mole of polyhydroxy benzene to from 1.0 to 1.05 moles of formaldehyde. Harder and stronger resinous products are obtained where the formaldehyde is present in the ratio of 1.2 moles for each mole of polyhydroxy benzene. However the mole proportion of formaldehyde may be as low as 0.5 per mole of polyhydroxy benzene if resinous materials of these proportions are desired.

In order to secure stability and good life in storage, it is desirable to neutralize any catalyst employed in reacting the polyhydroxy benzene and formaldehyde. The application of equimolar proportions of alkali to neutralize an acidic catalyst, for example, or vice versa, following termination of the initial reaction has been found to improve materially the life of the resin solution.

The varnishes derived from the reaction preferably contain polymers of a low molecular weight in order to insure solubility thereof in the solvents employed. It has been found that methanol must be a component of the solvent, if good shelf-life is to be obtained. Approximately 30% by weight of the varnish should be methanol. Larger proportions of methanol have been found to impart better stability. For example, the resin solution produced in accordance with Example II has been stored for two years without any pronounced change or deterioration in its properties. The solvent for the varish may contain other organic solvent liquids in addition to methanol to secure a suitable viscosity, drying time and other characteristics. Ethanol, isopropanol, butanol, ethyl acetate and other volatile solvents may be added. Plasticizers, inhibitors and other agents also may be present.

The A-stage 1,3-polyhydroxy benzene-formaldehyde resin solutions or varnishes produced in accordance with the preceding examples may be applied to many uses. They may be applied as coatings to various base materials. They may be admixed with various other resins for producing paints or other coating compositions. A particularly desirable application for the resins is for the preparation of laminated or filled resinous materials. The resulting varnish solutions of the several examples may be applied to various fabrics, such as cotton, duck, asbestos cloth, asbestos paper, glass fiber cloth, or other fibrous materials, and, by drying the treated fabric at temperatures not in excess of 50° C. for thirty seconds, preferably drying at room temperature, a resin coated or impregnated sheet is obtained. It will be appreciated that the fabric may be woven, knitted, braided, or the like, or may be a paper or cardboard manufacture of any type. Various wood products, such as veneers, wood pulp, sawdust or the like may be treated with the resin solutions of this invention, in order to impregnate them with the resinous materials to produce moldable materials. Obviously, pigments, plasticizers, dyes and other agents may be incorporated in the resins.

The fabrics, papers, or other treated materials, carrying the resinous low polymers may be subsequently subjected to heat and pressure to polymerize further and to convert the resinous materials to the infusible and insoluble state. For example, a plurality of laminations of cotton cloth impregnated with the resorcinol formaldehyde resin of Example II were superimposed and placed in a die where they were subjected to a pressure of 500 pounds per square inch at 80° C. for ten minutes. Laminates having an excellent appearance were produced. The laminates had good mechanical and electrically insulating properties. The products had a lower flammability than monohydroxy benzene formaldehyde products.

A resorcinol-paraformaldehyde A-stage resin as produced in Example IV in methanol was applied to kraft paper and the methanol was evaporated at room temperature. A number of sheets of the treated kraft paper were superimposed and molded into a one-sixteenth inch thick laminate in less than ten minutes at 95° C. at a pressure of a thousand pounds per square inch. The laminated product was quite strong and possessed excellent electrical properties. When heated at elevated temperatures, the products were subject to a lesser degree of change of shape under pressure as compared to monohydroxy benzene-formaldehyde laminates.

Since certain changes in carrying out the above process may be made without departing from the scope of the disclosure, it is intended that all matter contained in the above description be interpreted as illustrative and not in a limiting sense.

I claim as my invention:

1. A composition comprising the resinous reaction product of from 0.67 to 1.1 moles of a substantially anhydrous polyhydroxy benzene having the unit formula

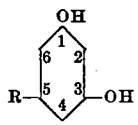

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction.

2. A composition comprising the resinous reaction product of from 0.67 to 1.1 moles of a substantially anhydrous polyhydroxy benzene having the unit formula

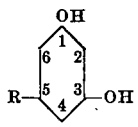

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the poly- hydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction, the reaction product being potentially reactive to a thermoset state and a solvent for the reaction product, the solvent comprising substantially anhydrous methanol having not over 2% water equal to at least 25% of the weight of the reaction product.

3. A composition comprising the resinous reaction product of from 0.67 to 1.1 moles of a substantially anhydrous polyhydroxy benzene having the unit formula

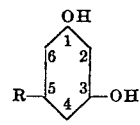

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction, the reaction product being solid and potentially reactive to a thermoset state.

4. A composition comprising the resinous reaction product of from 0.67 to 1.1 moles of a substantially anhydrous polyhydroxy benzene having the unit formula

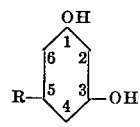

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction, the reaction product being in the thermoset state.

5. An article of manufacture comprising, in combination, particles of material and applied thereto a composition comprising the resinous reaction product of from 0.67 to 1.1 moles of a substantially anhydrous polyhydroxy benzene having the unit formula

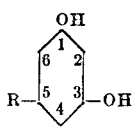

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction.

6. An article of manufacture comprising a fibrous material and applied thereto a composition comprising the resinous reaction product of from 0.67 to 1.1 moles of a substantially anhydrous polyhydroxy benzene having the unit formula

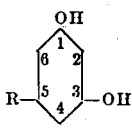

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction.

7. A molding composition capable of being molded under heat and pressure comprising a fibrous material and applied thereto, a composition comprising the resinous reaction product of from 0.67 to 1.1 moles of a substantially anhydrous polyhydroxy benzene having the unit formula

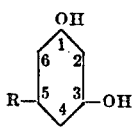

where R is a radical selected from the group consisting of hydrogen, hydroxyl, halide, carboxyl, and aliphatic radicals and having not more than one substituent from the group for hydrogen in the 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction, the resinous reaction product being potentially reactive to a thermoset state.

8. An article of manufacture comprising a fibrous material and applied thereto, a composition comprising the resinous reaction product of from 0.67 to 1.1 moles of a substantially anhydrous polyhydroxy benzene having the unit formula

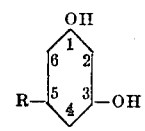

where R is a radical selected from the group consisting of hydrogen, hydroxyl, halide, carboxyl, and aliphatic radicals and having not more than one substituent from the group for hydrogen in th 2,4,6 positions, and one mole of a substantially anhydrous aldehyde selected from the group consisting of formaldehyde and polymers of formaldehyde, the reaction between the polyhydroxy benzene and aldehyde being carried out in a substantially anhydrous liquid non-reactive solvent having a boiling point not in excess of 100° C. and not over 2% water, the solvent comprising as the major constituent methanol in an amount equal to at least 25% of the combined weight of the polyhydroxy benzene, aldehyde and solvent, in the presence of a catalyst for the reaction, the composition being in the thermoset state.

9. In the process of preparing a reaction product of one mole of a substantially anhydrous polyhydroxy benzene having the unit formula

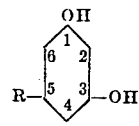

where R is a radical selected from the class consisting of hydrogen, hydroxyl, halide, carboxyl, and aliphatic radicals and having not more than one substituent from the group for hydrogen in the 2,4,6 positions, and between 0.5 to 1.5 moles of a substantially anhydrous aldehyde selected from the group consisting of formaldehyde and its polymers, the steps comprising admixing the polyhydroxy benzene and the aldehyde in a substantially anhydrous liquid non-reactive solvent having a boiling point of not in excess of 100° C. and not over 2% water, the solvent comprising methanol as the major constituent in an amount equal to at least 25% of the combined weight of the polyhydroxy benzene, aldehyde, and the solvent, adding a catalyst to promote the reaction of the polyhydroxy benzene and aldehyde, and refluxing the mixture at a temperature of not in excess of 100° C.

10. The process of preparing a composition which comprises admixing from about 0.67 to 1.1 moles of a substantially anhydrous polyhydroxy benzene having the unit formula

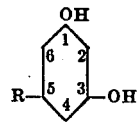

where R is a radical selected from the class consisting of hydrogen, hydroxyl, halide, carboxyl, and aliphatic radicals and having not more than one substituent from the group for hydrogen in the 2,4,6 positions one mole of a substantially anhydrous aldehyde selected from the group consisting of formaldehyde and its polymers, a substantially anhydrous liquid non-reactive solvent having a boiling point of not in excess of 100° C. and not over 2% water, the solvent comprising methanol as the major constituent in an amount equal to at least 25% of the combined weight of the polyhydroxy benzene, aldehyde, and the solvent, and a catalyst to promote the reaction of the polyhydroxy benzene and aldehyde, refluxing the mixture at a temperature of not in excess of 100° C., to produce a potentially reactive resinous composition, cooling the resulting product, and neutralizing the catalyst.

11. The process of preparing a resinous composition which comprises admixing 0.67 to 1.1 moles of substantially anhydrous resorcinol, 1 mole of paraformaldehyde, a substantially anhydrous liquid non-reactive solvent having a boiling point not in excess of 100° C. and not over 2% water, the solvent comprising methanol in an amount equal to not less than 25% of the combined weight of resorcinol, paraformaldehyde and solvent, and a catalyst to promote the reaction of resorcinol and paraformaldehyde, refluxing the mixture at a temperature not in excess of 100° C. to produce a potentially reactive resin, and cooling the resulting product.

12. The process of preparing a resinous composition which comprises admixing 0.67 to 1.1 moles of substantially anhydrous resorcinol, 1 mole of paraformaldehyde, a substantially anhydrous liquid non-reactive solvent having a boiling point not in excess of 100° C. and not over 2% water, the solvent comprising methanol as the major constituent in an amount equal to not less than 25% of the combined weight of resorcinol, paraformaldehyde, and solvent, and a catalyst to promote the reaction of resorcinol and paraformaldehyde, refluxing the mixture at a temperature not in excess of 100° C. to produce a potentially reactive resin, cooling the resulting product, and neutralizing the catalyst.

FRITZ J. NAGEL.

REFERENCES CITED

The following references are of record in the file of this patent:

UNITED STATES PATENTS

| Number | Name | Date |
|---|---|---|
| 1,776,366 | Novotny | Sept. 23, 1930 |
| 2,414,415 | Rhodes | Jan. 14, 1947 |

FOREIGN PATENTS

| Number | Country | Date |
|---|---|---|
| 275,678 | Great Britain | Aug. 10, 1927 |
| 350,934 | Great Britain | July 11, 1931 |

OTHER REFERENCES

Synthetic Orig. Chemicals, Carbide and Carbon Chem. Co., page 9, 1937. Copy in Div. 50.

A. Michael, Amer. Chem. Journal, vol. 5, pp. 338–53 (1883–4).